(12) United States Patent
Kato

(10) Patent No.: US 6,460,511 B2
(45) Date of Patent: *Oct. 8, 2002

(54) FUEL SUPPLY FOR DIRECT INJECTED ENGINE

(75) Inventor: Masahiko Kato, Shizuoka (JP)

(73) Assignee: Sanshin Kogyo Kabushiki Kaisha, Hamamatsu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/311,024

(22) Filed: May 13, 1999

(65) Prior Publication Data

US 2001/0047794 A1 Dec. 6, 2001

(30) Foreign Application Priority Data

May 13, 1998 (JP) .............................. 10-129811
Aug. 31, 1998 (JP) .............................. 10-244548

(51) Int. Cl.$^7$ .............................................. F02M 55/02
(52) U.S. Cl. ...................................................... 123/468
(58) Field of Search ................................ 123/468, 456, 123/469, 198 D

(56) References Cited

U.S. PATENT DOCUMENTS

| | | | |
|---|---|---|---|
| 3,810,581 A | * 5/1974 | Rhine et al. ............... 239/533 |
| 4,795,001 A | 1/1989 | Nakahama et al. |
| 4,811,717 A | * 3/1989 | Nakahama ................. 123/509 |
| 5,054,457 A | 10/1991 | Sakamoto |
| 5,069,189 A | 12/1991 | Saito |
| 5,095,881 A | 3/1992 | Nishimura et al. |
| 5,138,984 A | 8/1992 | Takashima |
| 5,172,666 A | 12/1992 | Nonaka |
| 5,184,589 A | 2/1993 | Nonaka |
| 5,241,939 A | 9/1993 | Nonaka |
| 5,404,858 A | * 4/1995 | Kato ........................... 123/516 |
| 5,553,579 A | * 9/1996 | Yoshida et al. ............. 123/295 |
| 5,699,766 A | 12/1997 | Saito |
| 5,701,872 A | 12/1997 | Kaku et al. |
| 5,819,708 A | * 10/1998 | Buratti et al. ............... 123/468 |
| 5,890,472 A | 4/1999 | Saito |
| 5,924,404 A | * 7/1999 | Ruman et al. ......... 123/406.18 |
| 5,992,392 A | 11/1999 | Saito |
| 6,032,638 A | 3/2000 | Kato |
| 6,067,966 A | 5/2000 | Saito et al. |
| 6,073,612 A | * 6/2000 | Ohkubo et al. ............. 123/456 |

* cited by examiner

Primary Examiner—Andrew M. Dolinar
Assistant Examiner—Arnold Castro
(74) Attorney, Agent, or Firm—Knobbe, Martents, Olson & Bear LLP

(57) ABSTRACT

An improved fuel supply arrangement for a direct fuel injected engine. In one feature, the fuel supply arrangement comprises a high pressure fuel pump for developing high pressure in fuel, a fuel injector for directly injecting the fuel into combustion chamber of the engine and a flexible conduit for connecting the high pressure fuel pump and the fuel injector. In another feature that is for a multi-cylinder engine, the fuel supply arrangement comprises a high pressure fuel pump for developing high pressure in fuel, a plurality of fuel injectors for directly injecting the fuel into respective combustion chambers of the engine, a fuel supply rail for supplying the fuel from the high pressure fuel pump to the fuel injectors and a flexible conduit for connecting the high pressure fuel pump and the fuel supply rail.

49 Claims, 12 Drawing Sheets

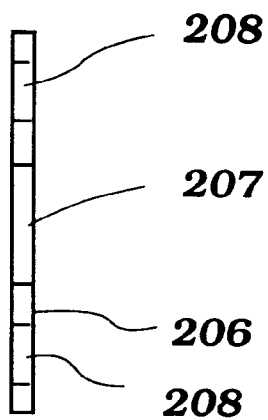
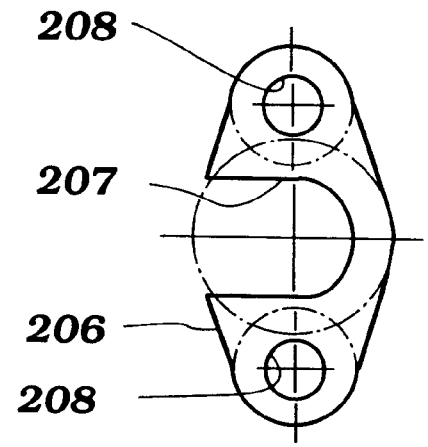
Figure 13a          Figure 13b
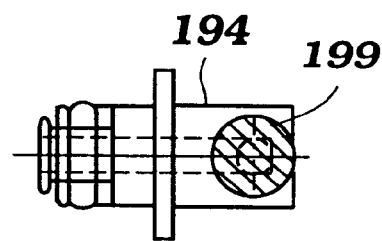
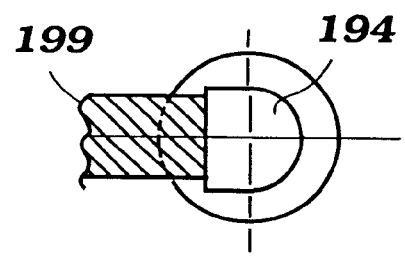
Figure 14a          Figure 14b

FUEL SUPPLY FOR DIRECT INJECTED ENGINE

BACKGROUND OF THE INVENTION

1. Field of the Invention

This invention relates to a fuel supply system for a direct fuel injected engine and more particularly to an improved fuel supply arrangement that is the most suitable for a direct fuel injected engine used in outboard motors.

2. Description of Related Art

As is well known, in all fields of engine design there is an increasing emphasis on obtaining more effective emission control, better fuel economy and, at the same time, continued high or higher power output. This trend has resulted in the substitution of fuel injection systems for carburetors as the engine charge former. In the common systems used, fuel is injected into an intake air manifold. In order to obtain still further improvement, direct injection systems are being considered. These systems inject fuel directly into the combustion chamber and thus have significant potential advantages.

This direct injection, however, means that the pressure for injecting fuel into the combustion chamber is higher than with manifold injection systems wherein the pressure is at substantially atmospheric or even below. Electric pumps are not totally capable of supplying such high pressures.

In order to supply the necessary pressure for a direct cylinder injection, it has been proposed to employ a fuel supply system of the type used with manifold injection systems with the addition of a high pressure mechanical pump to supply the pressures required for direct cylinder injection. This is comprised of an engine driven pump which supplies fuel to a vapor separator in which the electrically operated fuel pump that is driven off of the engine and which can generate higher pressures as required by the direct injection system. This type of system can be quite effective.

However, in connection with outboard motors, the direct injection system causes problems in other aspects.

Heretofore, engines which employs this kind of direct high pressure fuel injection system are provided with components such as a high pressure fuel pump, a pump drive unit, a high pressure regulator, fuel injectors and fuel supply rails. In automobile engines, generally all of these components are mounted on a cylinder head member. Some of or all of the components are unified together to form a high pressure fuel injection assembly and then mounted on the cylinder head member. However, since each component has own tolerance, the high pressure fuel injection assembly holds accumulated tolerances. Also, the engine, on which the high pressure fuel injection assembly is mounted, per se contains accumulated tolerances. In addition, these components generate vibrations during the engine operation. In order to absorb the accumulated tolerances and the vibrations, usually, the automobile engines employ metal pipes that allow small deformations, as a part of high pressure fuel delivery pipes.

However, if the components are mounted on different portions of the engine relative to each other, for example, the cylinder block and the cylinder head member, the accumulated tolerances and the vibrations are not absorbed very well even though such metal pipes are used. One reason for the inferior absorption of the vibration is that each portion of the engine has own characteristic frequency.

Generally, outboard engines have this arrangement. That is, in the outboard engine, since cylinders are vertically spaced, the fuel supply rails supporting the fuel injectors are mounted on the lateral part of the engine, i.e., the cylinder head member. In the meantime, the high pressure fuel pump and the pump drive unit are mounted on the upper part of the engine, i.e., the cylinder block.

A jig is useful for assembling the fuel injection unit and the differences between respective components are considerably adjusted. However, mounting eyes or bosses on the engine still slightly vary from each other due to respective tolerances of the engine parts. Thus, if knock pins would be provided on the engine parts, the high pressure fuel injection assembly might not be mounted onto the engine.

Also, usually, the abovenoted metal pipes are merely made of an iron-base material with surface treatment such as plating. This can give rise a problem of corrosion particularly with the outboard motors that are used at sea. In addition, such metal pipes may cause metal fatigue. This is a serious problem with the outboard motors. Because, generally the engines for outboard motors have much vibration even under normal running conditions. In addition, due to the allowed deformations, the metal pipes are somewhat inferior in rigidity or stiffness and tend to invite deterioration in endurance when much stress is exerted. Incidentally, rubber-base materials are not suitable for engines because they are incompatible with the fuel such as a gasoline.

It is, therefore, a principal object of this invention is to provide a fuel supply arrangement for a direct fuel injection system whereby problems with accumulated tolerances, vibrations and corrosions can be resolved, which occur when mounting a high pressure fuel injection assembly onto an engine.

It is another object to provide a method of assembling the fuel supply arrangement, particularly that may provide an easy positioning of the components that form a high pressure fuel injection assembly.

SUMMARY OF THE INVENTION

This invention is adapted to be embodied in a direct fuel injected system for an internal combustion engine.

In accordance with one aspect of this invention, the fuel injected system has a high pressure fuel pump for developing high pressure in fuel. A fuel injector is provided for directly injecting the fuel into combustion chamber of the engine. A flexible conduit is provided for connecting the high pressure fuel pump and the fuel injector.

This invention is also adapted to be embodied in a direct fuel injected system for a multi-cylinder internal combustion engine.

In accordance with another aspect of this invention, the fuel injected system has a high pressure fuel pump for developing high pressure in fuel. A plurality of fuel injectors are provided for directly injecting the fuel into respective combustion chambers of the engine. A fuel supply rail is provided for supplying the fuel from the high pressure fuel pump to the fuel injectors. A flexible conduit is provided for connecting the high pressure fuel pump and the fuel supply rail.

In accordance with a method of practicing one feature of this invention, the direct fuel injected system is for a multi-cylinder internal combustion engine that includes the abovenoted components therein. The method includes the step of temporarily connecting both of the high pressure fuel pump and the fuel supply rail relative to each other by means of a temporary member. The step of temporarily affixing the temporary member to the engine is also included. The step of fixing the high pressure fuel pump and the fuel supply rail to the engine is further included. The step of removing the temporary member from the engine is also included.

BRIEF DESCRIPTION OF THE DRAWING

These and other features of this invention will now be described with reference to the drawings of preferred embodiments which are intended to illustrate and not to limit the invention, and which;

FIG. 13A shows a side view (left-hand) and FIG. 13B shows a front view (right-hand) of a fixing member that is used for fixing a connector portion of the flexible conduit.

FIG. 14A shows a side view (left-hand) and FIG. 14B shows a front view (right-hand) of the connector portion.

DETAILED DESCRIPTION OF THE PREFERRED EMBODIMENTS OF THE INVENTION

The general overall environment in which the invention is practiced and certain details of the engine will be described primarily by reference to FIG. 1, additionally to FIGS. 2 and 3, and partly to FIG. 4.

Figure 1:
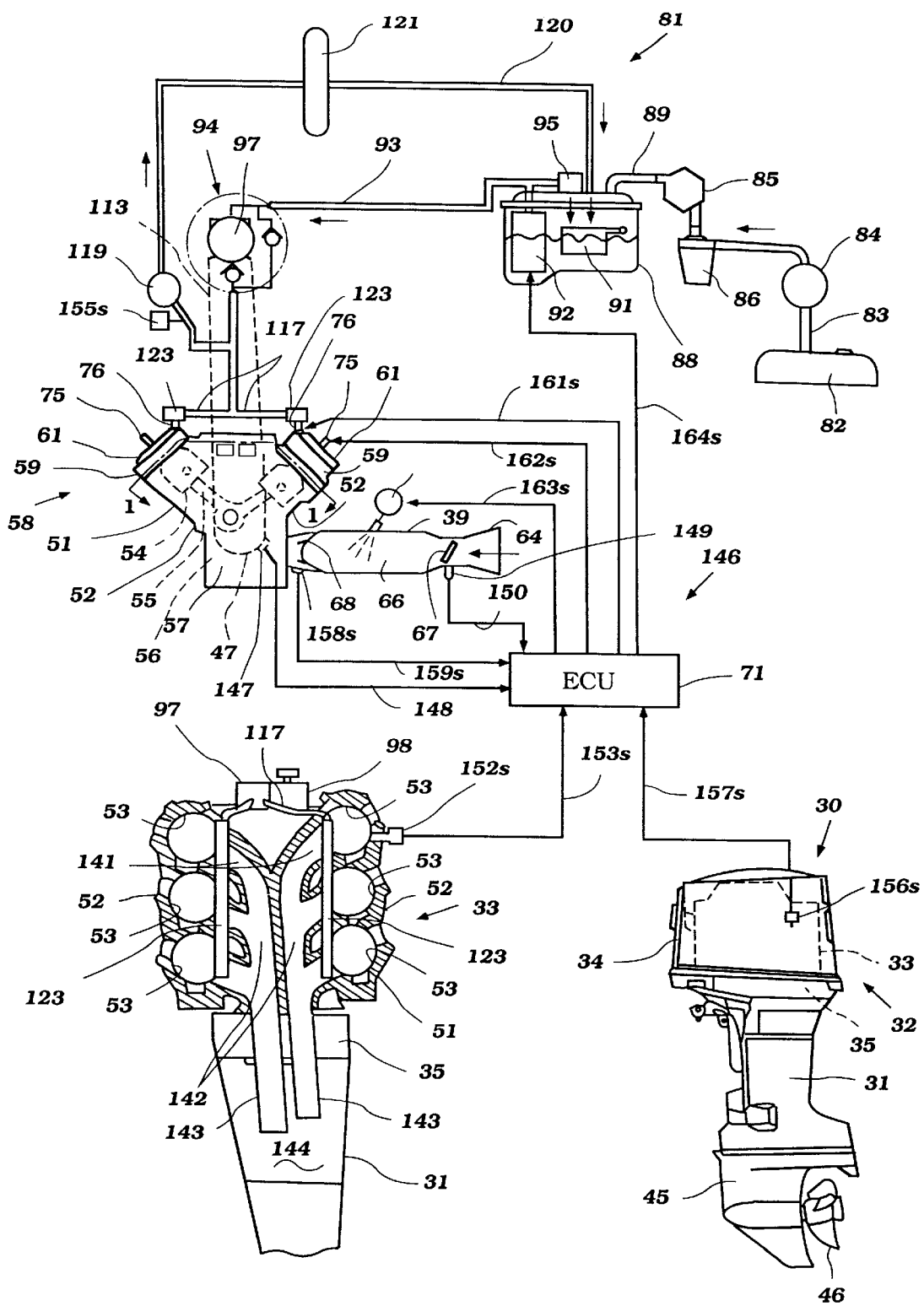
FIG. 1 is a multi-part view showing: in the lower right-hand portion, an outboard motor embodying the inventions; in the upper view, a partially schematic view of the engine of the outboard motor with its induction; in the lower left-hand portion, a rear elevational view of the outboard motor with portions removed and other portions broken away and shown in section along the line 1—1 in the upper view so as to more clearly show the construction of the engine; and fuel injection system shown in part schematically. An ECU (Electric Control Unit) for the motor links the three views together.

In the lower-right hand view of the FIG. 1, an outboard motor constructed and operated in accordance with an embodiment of the invention is depicted in side elevational view and is identified generally by the reference numeral 30.

The entire outboard motor 30 is not depicted in that the swivel bracket and clamping bracket that are associated with the driveshaft housing, indicated generally by the reference numeral 31, are not illustrated. This is because these components are well known in the art and the specific method by which the outboard motor 30 is mounted to the transom of an associated watercraft is not necessary to permit those skilled in the art to understand or practice the invention.

The outboard motor 30 includes a power head, indicated generally by the reference numeral 32, that is positioned above the driveshaft housing 31 and which includes a powering internal combustion engine, indicated generally by the reference numeral 33. This engine 33 is shown in more detail in the remaining two views of this figure and will be described shortly by reference thereto.

The power head 32 is completed by a protective cowling which includes a main cowling member 34. This main cowling member 34 is detachably connected to an exhaust guide 35 which is a lower tray portion of the protective cowling 32 and encircles an upper portion of the driveshaft housing 31. The main cowling member 34 has a pair of compartments (not shown) placed at rear and both sides of its body. The compartments open rearwardly so that air is introduced into these compartments. Air inlet barrels 38 (see FIG. 2), which have no bottom portion, stand in the respective compartments. The air inlet barrels 38 look, like a funnel and the compartments are connected with interior of the cowling 34 through the air inlet barrel 38. Thus the air is admitted into interior of the cowling 34 and then goes to an air induction system, indicated generally by the reference numeral 39.

Positioned beneath the driveshaft housing 31 is a lower unit 45 in which a propeller 46, which forms the propulsion device for the associated watercraft, is journaled.

As is typical with outboard motor practice, the engine 33 is supported in the power head 32 so that its crankshaft 47 (see the upper view) rotates about a vertically extending axis. This is done so as to facilitate connection of the connection of the crankshaft 47 to a driveshaft (not shown) which depends into the driveshaft housing 31 and which drives the propeller 46 through a conventional forward, neutral, reverse transmission contained in the lower unit 45.

The details of the construction of the outboard motor and the components which are not illustrated may be considered to be conventional or of any type known to those wishing to utilize the invention disclosed herein. Those skilled in the art can readily refer to any known constructions with which to practice the invention.

Referring now in detail to the construction of the engine 33 still by primary reference to FIG. 1, in the illustrated embodiment, the engine 33 is of the V6 type and operates on a two stroke, crankcase compression principle. Although the invention is described in conjunction with an engine having this cylinder number and cylinder configuration, it will be readily apparent that the invention can be utilized with engines having other cylinder numbers and other cylinder configurations. Some features of the invention, however, have particular utility in connection with V-type engines.

Also, although the engine 33 will be described as operating on a two stroke principle, it will also be apparent to those skilled in the art that certain facets of the invention can be employed in conjunction with four stroke engines. In fact, some features of the invention also can be employed with rotary type engines.

The engine 33 is comprised of a cylinder block 51 that is formed with a pair of cylinder banks 52. Each of these cylinder banks 52 is formed with three vertically spaced, horizontally extending cylinder bores 53. Pistons 54 reciprocate in these cylinder bores 53. The pistons 54 are, in turn, connected to the upper or small ends of connecting rods 55. The big ends of these connecting rods are journaled on the throws of the crankshaft 47 in a manner that is well known in this art.

The crankshaft 47 is journaled in a suitable manner for rotation within a crankcase chamber 56 that is formed in part by a crankcase member 57 that is affixed to the cylinder block 51 in a suitable manner. As is typical with two stroke engines, the crankshaft 47 and crankcase chamber 56 are formed with seals so that each section of the crankcase that is associated with one of the cylinder bores 53 will be sealed from the others. This type of construction is well known in the art.

A cylinder head assembly, indicated generally by the reference numeral 58, is affixed to the end of the cylinder banks 52 that are spaced from the crankcase chamber 56. These cylinder head assemblies 58 are comprised of a main cylinder head member 59 that defines a plurality of recesses (not shown) in its lower face. Each of these recesses corporate with the respective cylinder bore 53 and the head of the piston 54 to define the combustion chambers of the engine. This is also well known in the art. A cylinder head cover member 61 completes the cylinder head assembly 58. The cylinder head members 59 and the cylinder block 51 are affixed to each other and to the respective cylinder banks 52 in a suitable, known manner.

The air induction system 39 is provided for delivering an air charge to the sections of the crankcase chamber 56 associated with each of the cylinder bores 53. This communication is via an intake port 63 formed in the crankcase member 57 and registering with each such crankcase chamber section.

The induction system 39 includes an air silencing and inlet device, shown schematically in this figure and indicated by the reference numeral 64. The actual construction of this air charge device appears in FIGS. 2. In actual physical location, this device 64 is contained within the cowling 34 at the forward end thereof and has a rearwardly facing air inlet opening 65 through which air is introduced.

The air inlet device 64 supplies the induced air to a plurality of throttle bodies 66, each of which has a throttle valve 67 provided therein. These throttle valves 67 are supported on throttle valve shafts (not shown). These throttle valve shafts are linked to each other for simultaneous opening and closing of the throttle valves 67 in a manner that is well known in this art.

As is also typical in two stroke engine practice, the intake ports 63 have, provided in them, reed-type check valves 68.

These check valves 68 permit the air to flow into the sections of the crankcase chamber 56 when the pistons 54 are moving upwardly in their respective cylinder bores. However, as the pistons 54 move downwardly, the charge will be compressed in the sections of the crankcase chamber 56. At that time, the reed type check valve 68 will close so as to permit the charge to be compressed. In addition, lubricant pumps 69 are provided for spraying lubricant into the throttle bodies 66 for engine lubrication under the control of an ECU (Electronic Control Unit) 71 that will be described more in detail later. Although it is not shown, some forms of direct lubrication may be also employed for delivering lubricant directly to certain components of the engine.

The charge which is compressed in the sections of the crankcase chamber 56 is then transferred to the combustion chambers as through a scavenging system (not shown) in a manner that is well known. A spark plug 75 is mounted in the cylinder head assembly 58 for each cylinder bore at openings 75a. The spark plug 75 is fired under the control of the ECU 71.

The spark plug 75 fire a fuel air charge that is formed by mixing fuel directly with the intake air via a fuel injector 76. The fuel injectors 76 are solenoid type and electrically operated also under the control of the ECU 71. The fuel injectors 76 are mounted directly in the cylinder head member 59 in a specific location, as will be described, so as to provide optimum fuel vaporization or diffusion under all running conditions.

Fuel is supplied to the fuel injectors 76 by a fuel supply system, indicated generally by the reference numeral 81 and which will be described first by reference to FIG. 1 and particularly the upper and lower left hand portions thereof.

The fuel supply system 81 comprises a main fuel supply tank 82 that is provided in the hull of the watercraft with which the outboard motor 30 is associated. Fuel is drawn from this tank 82 througha conduit 83 by means of a first low pressure pump 84 and a plurality of second low pressure pumps 85. The first low pressure pump 84 is a manually operated pump and the second low pressure pumps 85 are diaphragm type pumps operated by variations in pressure in the sections of the crankcase chamber 56, and thus provide a relatively low pressure.

A quick disconnect coupling (not shown) is provided in the conduit 83 and also a fuel filter 86 is positioned in the conduit 83 at an appropriate location.

From the low pressure pump 85, fuel is supplied to a vapor separator 88 which is mounted on the engine 33 or within the cowling 34 at an appropriate location. This fuel is supplied through a line 89. At the vapor separator end of the line 89, there is provided at a float valve (not shown) that is operated by a float 91 so as to maintain a uniform level of fuel in the vapor separator 88.

A high pressure electric fuel pump 92 is provided in the vapor separator 88 and pressurizes fuel that is delivered through a fuel supply line 93 to a high pressure pumping apparatus, indicated generally by the reference numeral 94. The electric fuel pump 92, which is driven by an electric motor, develops a pressure such as 3 to 10 kg/cm$^2$. A low pressure regulator 95 is positioned in the fuel supply line 93 at the vapor separator 88 and limits the pressure that is delivered to the high pressure pumping apparatus 94 by dumping the fuel back to the vapor separator 88.

The high pressure fuel delivery system 94 includes a high pressure fuel pump 97 that can develop a pressure of, for example, 50 to 100 kg/cm$^2$ or more. A pump drive unit 98 (the lower left hand view) is provided for driving the high pressure fuel pump 97. The high pressure fuel pump 97 is mounted on the pump drive unit 98 with bolts 97a.

Figure 2:
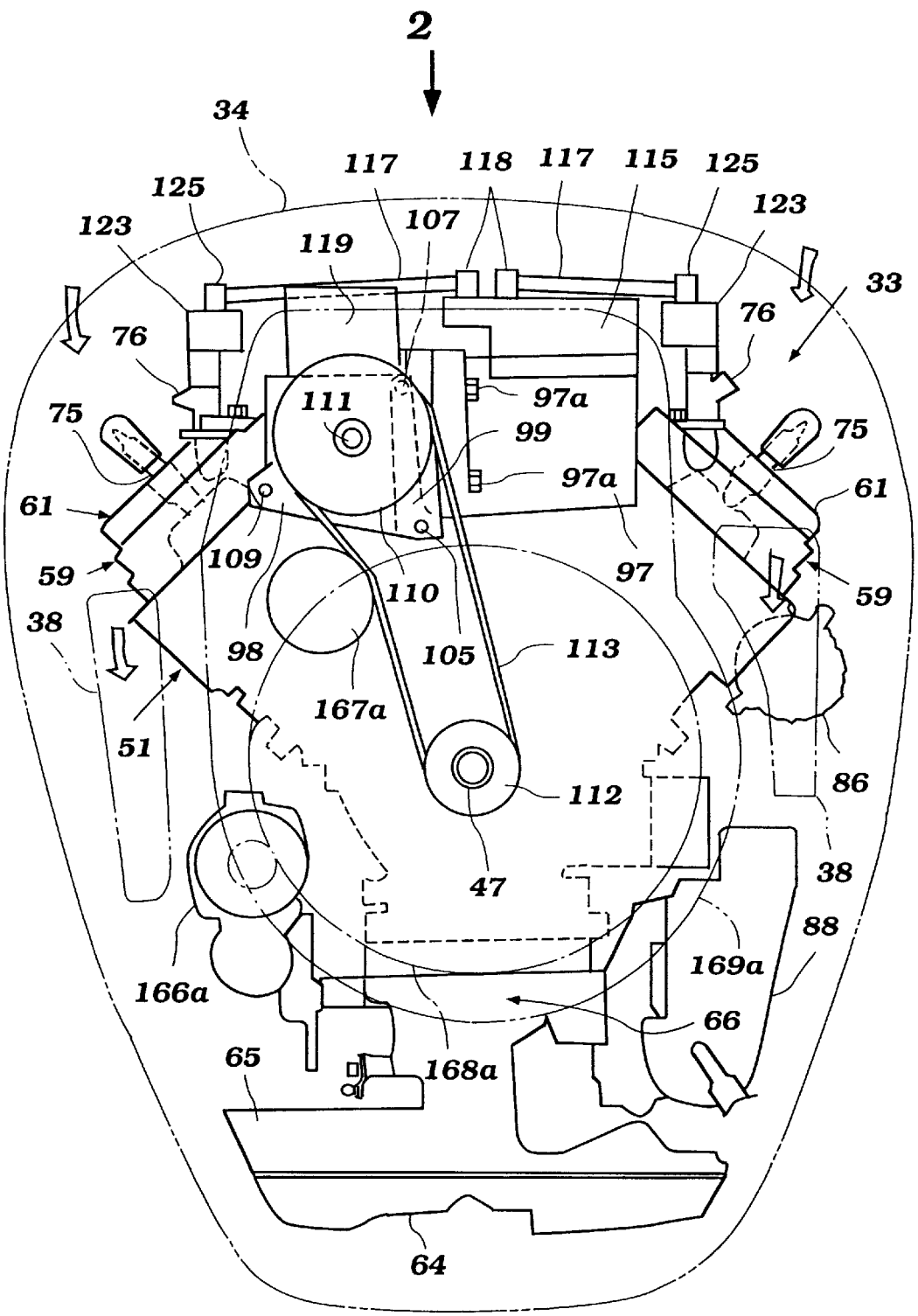
FIG. 2 is a top plan view of the power head showing the engine in solid lines and the protective cowling in phantom.
Figure 3:
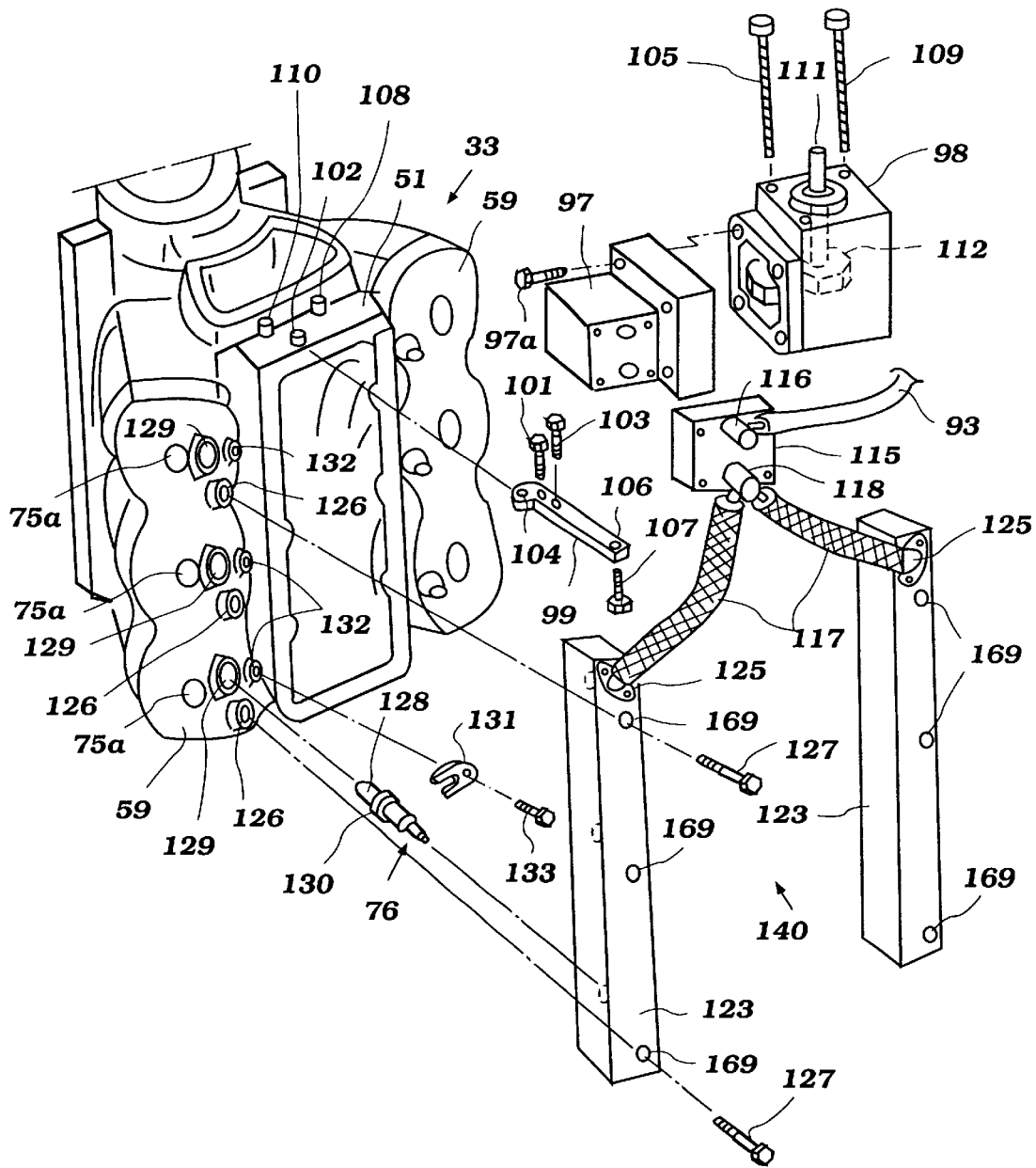
FIG. 3 is a perspective view showing components relating to a high pressure fuel injection assembly exploded from the engine, and is taken generally in the direction of the arrow 2 in FIG. 2.
Figure 4:
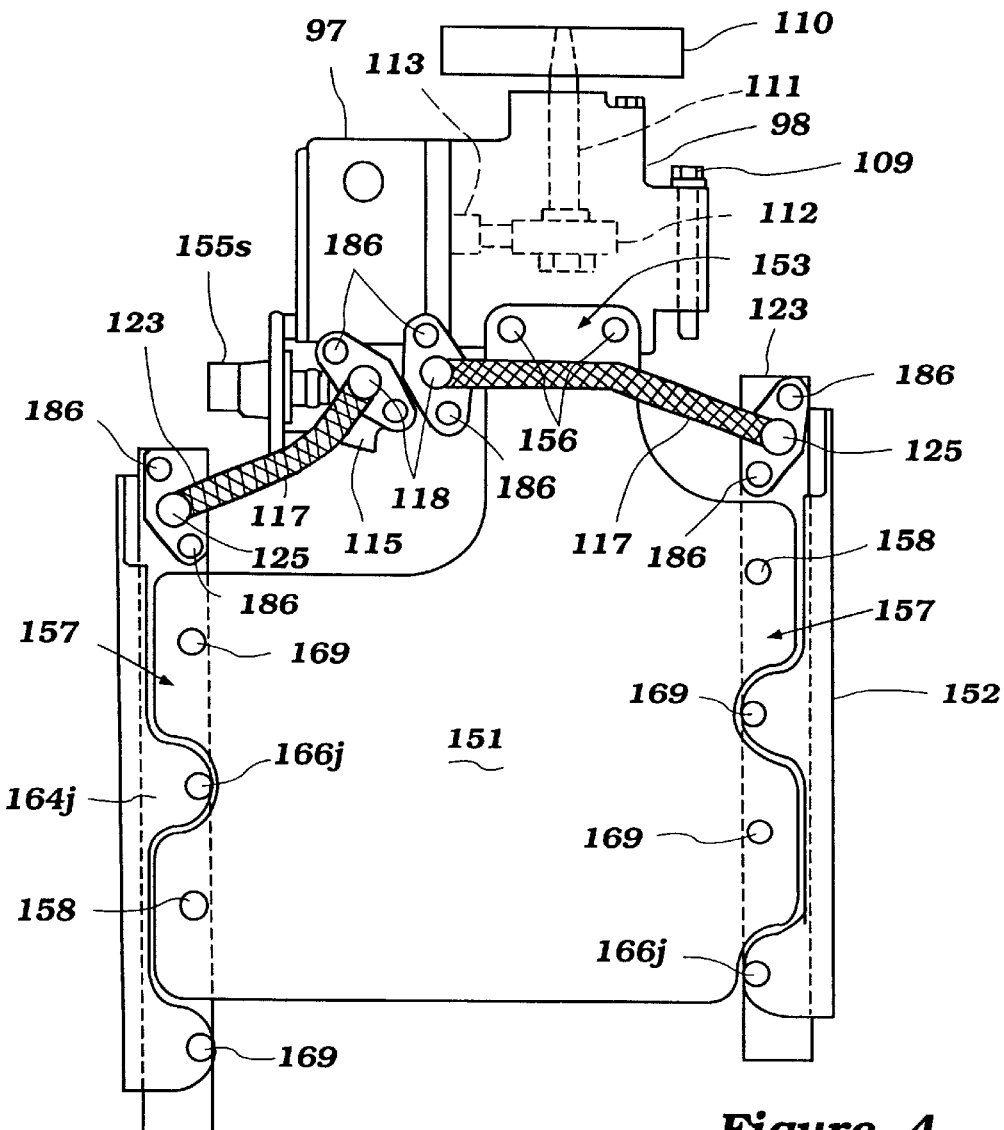
FIG. 4 is a rear elevational view showing the high pressure fuel injection assembly that is temporarily assembled with jigs.

Referring to FIGS. 2 and 3, and partly FIG. 4, a stay 99 is affixed to the cylinder block 51 at a bosses 100 with a bolt 101 and at a boss 102 with a bolt 103. Then, the pump drive unit 98 is affixed to the stay 99 at a bolt hole 104 with a bolt 105 and at bolt hole 106 with a bolt 107. The pump drive unit 98 is, further, affixed to the cylinder block 51 directly at a boss 108 with a bolt 109. Thus, the pump drive unit 98 overhangs between the two banks 52 of the V arrangement. A pulley 110 is affixed to a pump drive shaft 111 of the pump drive unit 98. The pulley 110 is driven by a drive pulley 112 affixed to the crankshaft 47 by means of a drive belt 113 (see FIG. 4). The pump drive shaft 111 is provided with a cam disc 112 existing horizontally for pushing plungers 113 which are disposed on the high pressure fuel pump 97.

The high pressure fuel pump 97 has a unified fuel inlet and outlet module 115 which is mounted on a side wall of the pressure pump 97. The inlet and outlet module 115 has an inlet passage (not shown) connected to the fuel supply line 93 with a connector 116, while an outlet passage (not shown) is connected to a pair of flexible conduits 117 with a couple of connectors 118. In FIG. 3, this connecting construction is somewhat schematically shown and one connector 118 is omitted. The construction including the flexible conduits 117 will be described more in detail with reference to FIGS. 4 and 5 later.

Returning back to FIG. 1, the pressure of the fuel supplied by the fuel pump 97 is regulated to be the fixed value by a high pressure regulator 119 which dumps fuel back to the vapor separator 88 through a pressure relief line 120 in which a fuel heat exchanger or cooler 121 is provided. It is important to keep the fuel under the constant pressure. Because the fuel amounts are determined by changes of duration of injection under the condition that the pressure for injection is always the same.

Again referring to FIGS. 2 and 3, the flexible conduits 117 are connected to fuel supply rails 123 with connectors 125. The fuel supply rails 123 are made of metal so as to be rigid. Also. the fuel supply rails 123 are hollow tubes and its inner hollow, through which fuel flows, communicates with the flexible conduits 117 and also fuel injectors 76 when they are held on the fuel supply rails 123. The respective fuel rails 123 are affixed to both of the cylinder heads 59 at bosses 126 with positioning bolts 127. The fuel injectors 76 are held between the fuel supply rails 123 and the cylinder head members 59. Nozzle portions 128 of the fuel injectors 76 are inserted into bosses 129 so as to be exposed to combustion chambers. Flange portions 130 of the fuel injectors 76 are supported with horse shoe shaped spacers 131 that are affixed to the cylinder head member 59 at bosses 132 with bolts 133.

The bosses 126, 129, 132 are merely schematically shown in the other side view of the cylinder head member 59. The high pressure fuel pump 97, the pump drive unit 98, the inlet and outlet module 115, the flexible conduits 117, the fuel rails 123 and fuel injectors 76 are unified together. These unified components form a high pressure fuel injection assembly 140. The affixing construction will be described more in detail with reference to FIGS. 6 and 7 later.

Fuel is supplied from the high pressure fuel pump 97 to the flexible fuel conduits 117. The fuel conduits 117, in turn, deliver fuel to a pair of vertically extending fuel rails 123. The fuel rails 123, then, supply fuel to the fuel injectors 76. Returning back to FIG. 1, after the fuel charge has been formed in the combustion chambers by the injection of fuel from the fuel injectors 76, the charge is fired by firing the spark plugs 75. The injection timing and duration, as well as the control for the timing of firing of the spark plugs 75, are controlled by the ECU 71.

Once the charge burns and expands, the pistons 54 will be driven downwardly in the cylinder bores until the pistons 54 reach the lowermost position. At this time, an exhaust port (not shown) will be uncovered so as to open the communication with an exhaust passage 141 (see the lower left-hand view) formed in the cylinder block 51. The exhaust gasses flow through the exhaust passages 141 to manifold collector sections 142 of respective exhaust manifolds that are formed within the cylinder block 51. These exhaust manifold collector sections 142 communicate with exhaust passages formed in an exhaust guide plate 35 on which the engine 33 is mounted.

A pair of exhaust pipes 143 depend from the exhaust guide plate 35 and extends the exhaust passages 141 into an expansion chamber 144 formed in the driveshaft housing 31. From this expansion chamber 144, the exhaust gasses are discharged to the atmosphere through a suitable exhaust system. As is well known in outboard motor practice, this may include an underwater, high speed exhaust gas discharge and an above the water, low speed exhaust gas discharge. Since these types of systems are well known in the art, a further description of them is not believed to be necessary to permit those skilled in the art to practice the invention.

A feedback control system, indicated generally by the reference numeral 146 is provided for realizing a control strategy along which the initiation and duration of fuel injection from the injector 76 and timing of firing of the spark plug 75 are controlled. The feedback control system 146 comprises the ECU 71 and a number of sensors which sense either engine running conditions, ambient conditions or conditions of the outboard motor 30 that will effect engine performance. Certain of the sensors are shown schematically in FIG. 1 and will be described by reference to that figure.

There is provided, associated with the crankshaft 47, a crankshaft angle position sensor 147 which, when measuring crankshaft angle versus time, outputs a crankshaft rotational speed signal or engine speed signal indicated schematically at 148 to the ECU 71.

Operator demand or engine load, as determined by throttle, angle of the throttle valve 67, is sensed by a throttle position sensor 149 which outputs a throttle position or load signal 150 to the ECU 71. When the operator desires to gather speed, i.e., accelerate the engine speed, a throttle on a steering handle (not shown) is operated by the operator. The throttle valve 67 is, then, going to open toward the certain open position that corresponds to the desired speed at which air charge is induced more than before into the crankcase chamber 56 through the throttle bodies 66. Also, the engine load increases, for example, when the associated watercraft advances against wind. In this situation, the operator also operates the throttle so as to recover the speed that is lost.

A combustion condition or oxygen ($O_2$) sensor 152s is provided that senses the in cylinder combustion conditions by sensing the residual amount of oxygen in the combustion products at a time near the time when the exhaust port is opened. This output and air fuel ratio signal is indicted schematically at 153s to the ECU 71.

There is also provided a pressure sensor 155s in line connected to the pressure regulator 119. This pressure sensor 155s outputs the high pressure fuel signal to the ECU 71, which signal line is omitted in FIG. 1.

There also may be provided a water temperature sensor 156s (see the lower right-hand view) which outputs a cooling water temperature signal 157s to the ECU 71.

Further, an intake air temperature sensor 158s (see the upper view) is provided and this sensor 158 outputs an intake air temperature signal 159s to the ECU 71.

Although these are all sensors shown in FIG. 1, it is, of course, practicable to provide other sensors such as an engine height sensor, a trim angle sensor, a knock sensor, a neutral sensor, a watercraft pitch sensor and an atmospheric temperature sensor in accordance with various control strategies.

The ECU 71, as has been noted, outputs signals to the fuel injectors 76, spark plugs 75, the lubrication pumps 69 and the high pressure electric fuel pump 92 for their respective control. These control signals are indicated schematically in FIG. 1 at 161s, 162s, 163s and 164s, respectively.

In addition (see FIG. 2), a starter motor 166a for starting the engine 33, a tensioner 167a for giving tension to the belt 105, a flywheel 168a and a cover member 169a for covering the rotating components such as the high pressure fuel pump 97 are provided.

As described above, the high pressure fuel pump 97 and the pump drive unit 98 are mounted on the cylinder block 51, while the fuel injectors 76 and the fuel supply rails 123 are mounted on the cylinder head member 59. In other words, each group of the components is mounted on such a different engine portion. Meanwhile, the mounting eyes or bosses 100, 102 and 108 on the cylinder block 51 and the other bosses 126, 129 and 132 on the cylinder head member 59 vary from each other in positions due to respective tolerances of these engine parts. The tolerances and other tolerances belonging to the respective components are accumulated to cause differences in affixing positions for the respective components and these differences can hardly be absorbed if the components are assembled all together tightly. In addition, the vibrations that occurred in the assembled unit can scarcely absorbed well. In order to resolve these problems, a construction including the flexible conduits 117 and a method for affixing the components on the engine parts are provided in this embodiment. The construction and the method will be described hereunder with reference to FIGS. 4, 5, 6 and 7.

Figure 5:
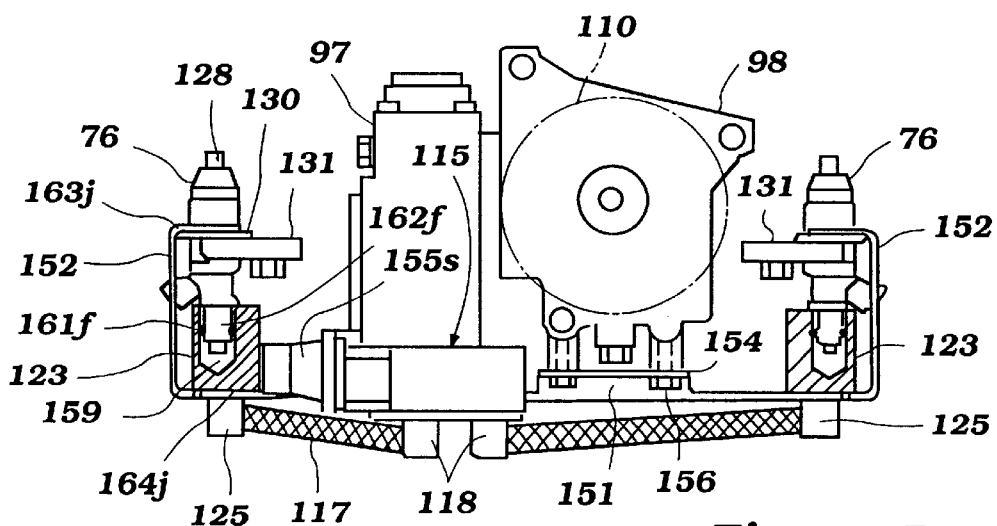
FIG. 5 is a top plan view showing the high pressure injection unit, partly in cross-section, under the same condition as shown in FIG. 4.

FIG. 4 illustrates a rear elevational view showing the high pressure fuel injection assembly 140 that is temporarily assembled with jigs 151 and 152. FIG. 5 illustrates a top plan view showing the high pressure injection assembly 140, partly in cross-section, under the same condition as shownin FIG. 4.

The pair of flexible conduits 117 are provided to connects components that are mounted on the different three portions on the engine 33, i.e., the cylinder block 52 and the right and left hand cylinder head members 59. The connectors 118 of the flexible conduits 117 are affixed to the unified inlet and outlet module 115 that belongs to the first group including the high pressure fuel pump 97 and the pump drive unit 98 that are mounted on the cylinder block 51. The other ends of the flexible conduits 117, i.e., the connectors 125, are affixed to the second and third groups, i.e., the respective fuel supply rails 123 including the fuel injectors 76, that are mounted on the right and left-hand cylinder head members 59. Incidentally, the connector 116 (FIG. 3) and the fuel supply line 93 (FIGS. 1 and 3) are not shown in FIG. 4.

Because of using the flexible conduits 117, the aforenoted problems in the accumulated tolerances and the vibrations are resolved. However, since the three groups of the components are connected with the flexible conduits 117, it is not easy to mount the high pressure fuel injection assembly 140 onto the engine 33. Because of this reason, the jigs 151 and 152 are employed.

The upper part 153 of first jig 151 is temporarily affixed to a flange 154 that is provided at the rear portion of the pump drive unit 98 with bolts 156, while the both sides 157 of the first jig 151 are affixed to the respective fuel supply rails 123 with bolts 158. Because of this, the pump drive unit 98 has bolt-holes (not shown) where the bolts 156 are inserted and the fuel supply rails 123 have bolt-holes (not shown) where the bolts 158 are inserted. The bolt-holes remains on the pump drive unit 98, both of the fuel supply rails 123 after removal of the first jig 151. The combination of the bolt 156 and the bolt-hole, and another combination of the bolt 158 and the bolt-hole form respective fastening units. With this first jig 151, the first, second and third groups of the components are unified. Under this condition, the fuel injectors 76 are press-fitted into fuel passages 159 (FIG. 5) of the respective fuel supply conduits 123 with O rings 161f putted onto the end portions 162f of the fuel injectors 76.

On the other hand, each second jig 152 has end portions 163j and 164j that are bent in the same direction. One end portion 163j is formed as a hook and this is engaged with the flange portion 130 of the fuel injectors 76 and the other end portion 164j is affixed to the fuel supply rail 123 with bolts 166j. Like with the first jig 81, the respective fuel supply rails 123 have bolt-holes,(not shown) where the bolts 158 are inserted and these bolt-holes remain on both of the fuel supply rails 123 after removal of the second jig 151. The combination of the bolt 166j and the bolt-hole forms a fixing unit.

As aforedescribed, the high pressure fuel injection assembly 140 is temporarily unified with the first and second jigs 151, 152. Then, the pump drive unit 98 is temporarily affixed to the stay 99 and the cylinder block 51. Meanwhile, the fuel supply rails 123 are temporarily affixed to the cylinder head members 59 at bosses 126 with the positioning bolts 127. The fuel injectors 76 are inserted into the bosses 129 of the cylinder head members 59 and affixed to there with the horseshoe shaped members 131 and the bolts 133. After completion of the temporary fixings, the first and second jigs 151, 152 are removed.

Figure 6:
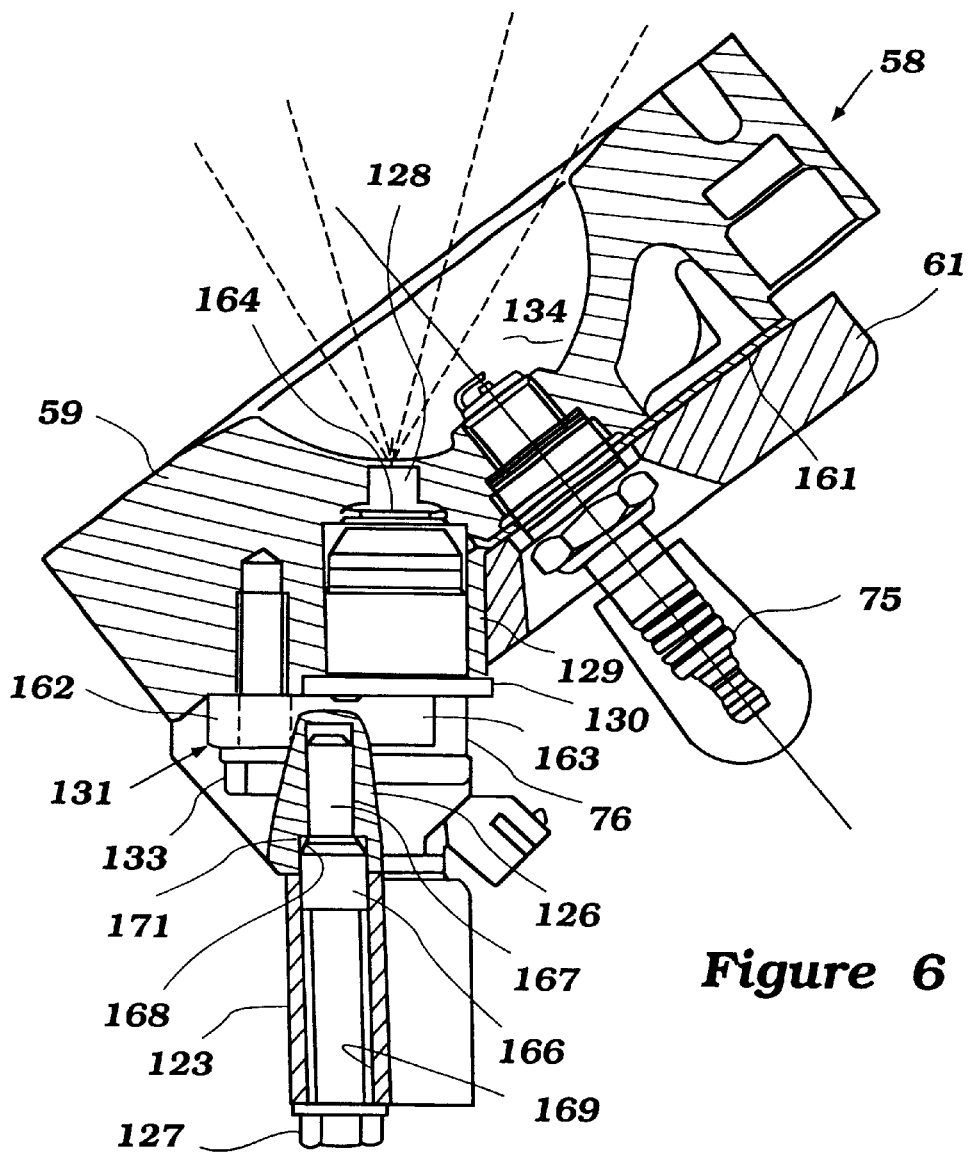
FIG. 6 is a cross-sectional view showing a construction wherein a fuel supply rail with a fuel injector is mounted on a cylinder head member.

FIG. 6 illustrates a cross-sectional view showing a construction wherein the fuel supply rail 123 with fuel injectors 76 is mounted on the cylinder head assembly 58, specifically, the cylinder head member 59.

The cylinder head assembly 58 comprises, as described above, the cylinder head member 59 and the cylinder head cover 61. A gasket 161 is provided between the cylinder head member 59 and the cylinder head cover 61. The fuel supply rail 123 is temporarily affixed to the bosses 126 on the cylinder head assembly 59 with the positioning bolt 127. Each horseshoe shaped member 131 has a fixing portion 162 and an engaging portion 163 that bifurcates from the fixing portion 162. The engaging portion 163 is engaged with the flange portion 130 of the fuel injector 76 and then the fixing portion 162 is affixed to the cylinder head member 59 with the bolt 133.

The horse shoe shaped member 131 is made of an anti-corrosion metal such as a stainless steel and an aluminum or a synthetic resin so as to prevent itself from deterioration in axial force due to corrosion. The axial force is given to the fuel injector 76 by the horseshoe shaped member 131 so as to press the nozzle potion 128 of the fuel injector 76 toward the combustion chamber 134 via a disc spring 136. If the axial force decreases, the nozzle portion 128 of the fuel injector 76 is not strictly pressed and then sealing by the disc spring 164 is impaired.

The positioning bolt 127 has a large diameter portion 166, a small diameter portion 167 and a tapered portion 168 that is formed between the large diameter portion 166 and the small diameter portion 167. When affixing the fuel rails 123 onto the cylinder head members 59, the positioning bolts 127 are inserted into large openings 169 provided on the fuel supply rails 123 so that the small diameter portions 167 are inserted into bolt-holes 171. For this purpose, the jigs 151, 152 also have openings corresponding to the large openings 169. With fastening up of the positioning bolts 127, the large diameter portions 166 are slipped into the bolt-holes 171 with function of the tapered portions 168 even if the axis of the bolt-hole is deviated with the axis of the large opening 169. Thus, the fuel supply rails 123 are finally accurately positioned. After completion of the positioning with the positioning bolts 127, the other temporarily affixed portions are rigidly affixed.

As is apparently from the description above, the large openings 169 need to have a sufficient diameter that can absorb the accumulated tolerances. However, actually, the large opening 169 is only slightly larger than the large diameter portion 166 of the positioning bolt 127. Since the difference in length is about 30μ, it is not visible in FIG. 6.

In this embodiment, the positioning bolt 127 is applied to affix the fuel rails 123 to the cylinder head member 59. However, it can be applied to affix the fuel pump 98 to the cylinder block 51 or to affix both of them to the respective engine parts.

Thus, the tolerances accumulated among the different bosses are absorbed by the fixture construction and the high pressure fuel injection assembly 140 is surely affixed to the respective engine parts.

Figure 7:
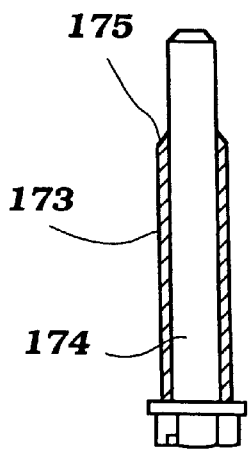
FIG. 7 is a partly cross-sectional view showing another example of a positioning bolt that is employed in the construction shown in FIG. 6.

FIG. 7 illustrates a partly cross-sectional view showing another example of the positioning bolt 127 that can be employed in the fixing construction of the fuel injectors 76 shown in FIG. 6.

A collar 173 is putted on a positioning bolt 174. The collar 173 is shorter than the positioning bolt 174 and its tip portion 175 is tapered like the tapered portion 168 of the positioning bolt 127. Thus, this positioning bolt 174 is the equivalent of the positioning bolt 127 and can replace it.

It should be noted that the positioning or position adjustment construction can be applied to the fixing of the pump drive unit 98 or both of the fixings of the fuel supply rails 123 and the pump drive unit 98.

It should be also noted that the jigs 151, 152 are not necessarily required. If these jigs 151, 152 are not used, the pump drive unit 98, both of the fuel supply rails 123 are fixed separately onto the respective engine parts and then the flexible conduits 117 are connected to each of them.

Figure 8:
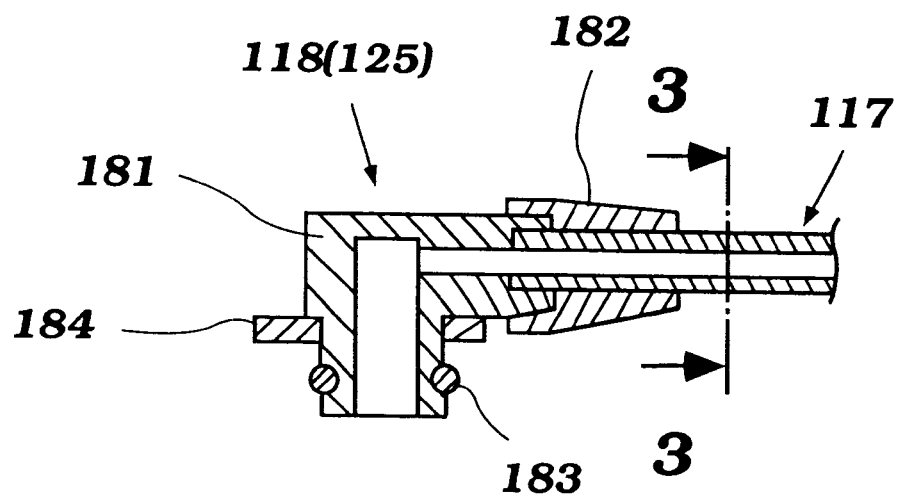
FIG. 8 is an enlarged cross-sectional view showing the flexible conduit, taken along its axis.

FIG. 8 illustrates an enlarged cross-sectional view showing the flexible conduit 117, taken along its axis.

The end portion of the flexible conduit 117 is provided with the connector 118 (125) that has an L-shaped metal connecting portion 181. The connector 118 is jointed with the flexible conduit 117 by caulking with a caulking member 182. The other end of the connector 118 is provided with an O ring 183 so as to be forced into the unified fulel inlet and outlet module 115 or the fuel supply rail 123. A fixing 184 is also provided on the connector 118. The connector 118 is affixed to the unified fuel inlet and outlet module 115 or the fuel supply rail 123 with bolts 186 (see FIG. 4).

Figure 9:
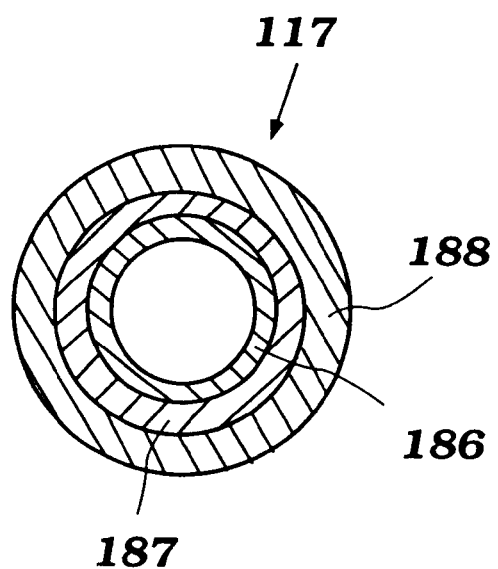
FIG. 9 is an enlarged cross-sectional view taken along the line 3—3 in FIG. 8 to show the multi-layered construction of the same flexible conduit.

FIG. 9 illustrates an enlarged cross-sectional view taken along the line 3—3 in FIG. 8 to show the multi-layered construction of the same flexible conduit 117.

As shown in this figure, the flexible conduit 117 is formed with an inner layer 186, a middle layer 187 and an outer layer 188. The inner layer is made of a synthetic resin, such as Teflon, that has the anti-pressure and oil-proof nature. The oil-proof nature includes, for example, the gasoline-proof nature if the fuel is gasoline. The middle layer 187 is made of an anti-corrosion mesh metal such as a stainless steel. The anti-corrosion nature means that the middle layer 187 is not corroded by surrounding gaseous or liquid substances, particularly by salt water or saline air. The mesh metal also increases the anti-pressure nature and precludes the inner layer 186 from being injured by any shock. The outer layer 188 is a cover member and is made of a flame retardant (incombustibility) material, for example, a fireproofed rubber. Thus, the flexible conduit has, as a whole, the anti-pressure, oil-proof, anti-corrosion and flame retardant nature as well as flexibility.

It should be noted that the inner layer 186, i.e., the synthetic resin may contain carbon fibers. The carbon fibers will prevent pinholes from coming into existence by fluid friction when static electricity is generated in the synthetic resin such as Teflon.

It should be also noted that the metal mesh of the middle layer 187 can be grounded.

Figure 10:
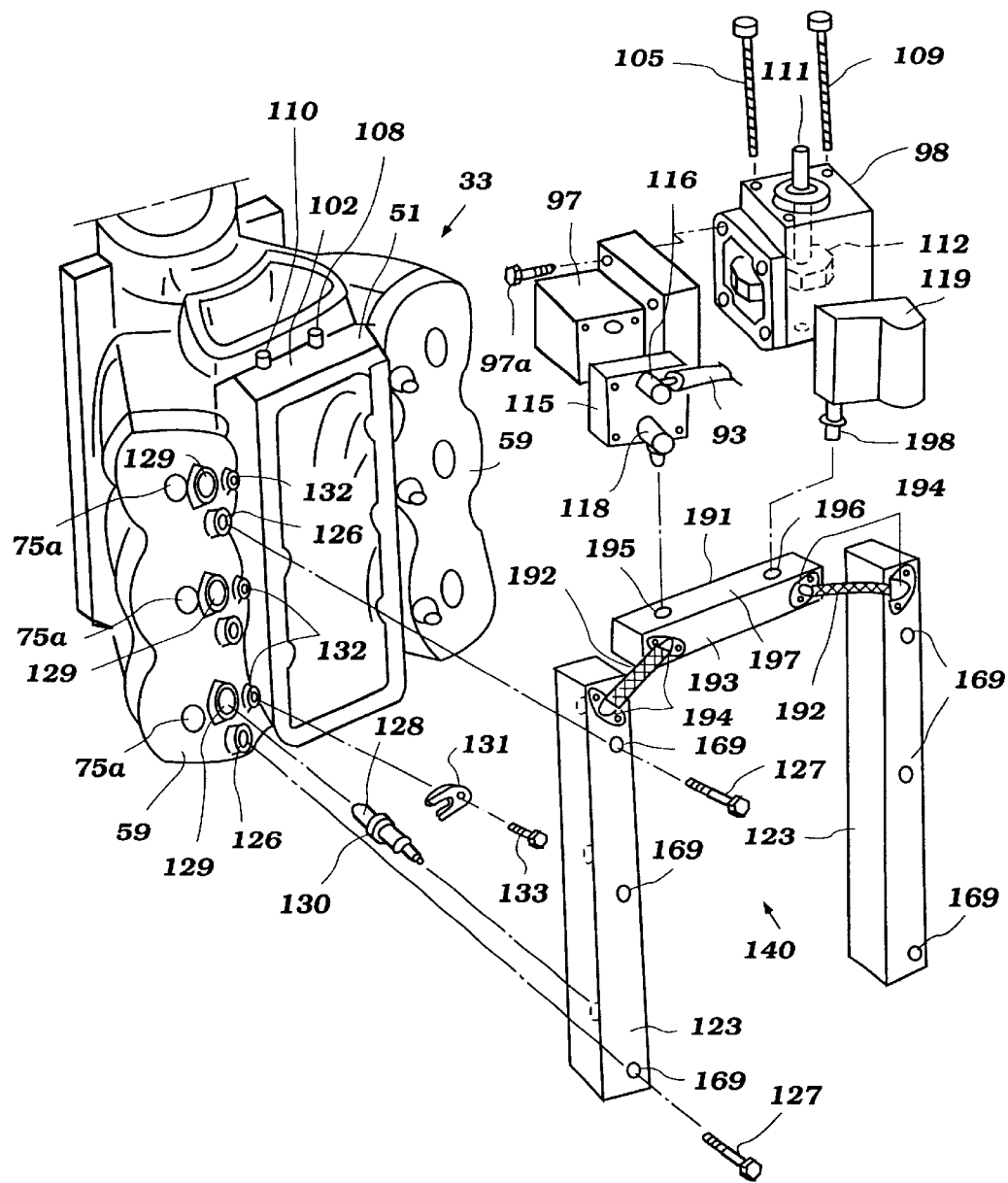
FIG. 10 is a perspective view showing another embodiment of the high pressure fuel injection assembly. The components of this high pressure fuel injection assembly is also exploded from the engine, as in the same manner as shown in FIG. 3. In addition, a pressure regulator is provided outside in this embodiment.

FIG. 10 illustrates a perspective view showing another arrangement of the high pressure fuel injection assembly. The components of this high pressure fuel injection assembly are also exploded from the engine. The same components or members as described in connection with the arrangement illustrated in FIGS. 1 to 9 are assigned with the same reference numerals so as to avoid redundancy. The components or members in the other variations and/or embodiments described hereunder will be the same.

In this arrangement, a third fuel supply rail 191 is provided between the pair of fuel supply rails 123. The third fuel supply rail 191 extends generally horizontally and a pair of flexible conduits 192 that are slightly different from the flexible conduits 117 are connected at each rear side 193 of the third fuel supply rail 191 with connectors 194. Differences in the flexible conduits 192, 117 will be described with reference to FIG. 11 shortly. The third fuel supply rail 191 is made of metal so as to be rigid. Also, the third fuel supply rail 191 is a hollow tube and its inner hollow, through which fuel flows, communicates with the pair of flexible conduits 192. The third fuel supply rail 191 has two apertures 195, 196 on its upper surface 197 that communicate with the inner hollow. The aperture 195 is connected with the unified fuel inlet and outlet module 115 via the connector 118, while the aperture 196 is connected with the pressure regulator 119 with a connector 198. The third fuel supply rail 191 is affixed to a stay (not shown in FIG. 10) that is fixed to the cylinder block 51. The stay 99 shown in FIG. 3 can serve as this stay with a slight change in which some bolt-holes are provided where the third fuel supply rail 191 is affixed with bolts. Otherwise, the third fuel supply rail 191 can be affixed to the cylinder block 51 directly.

Figure 11:
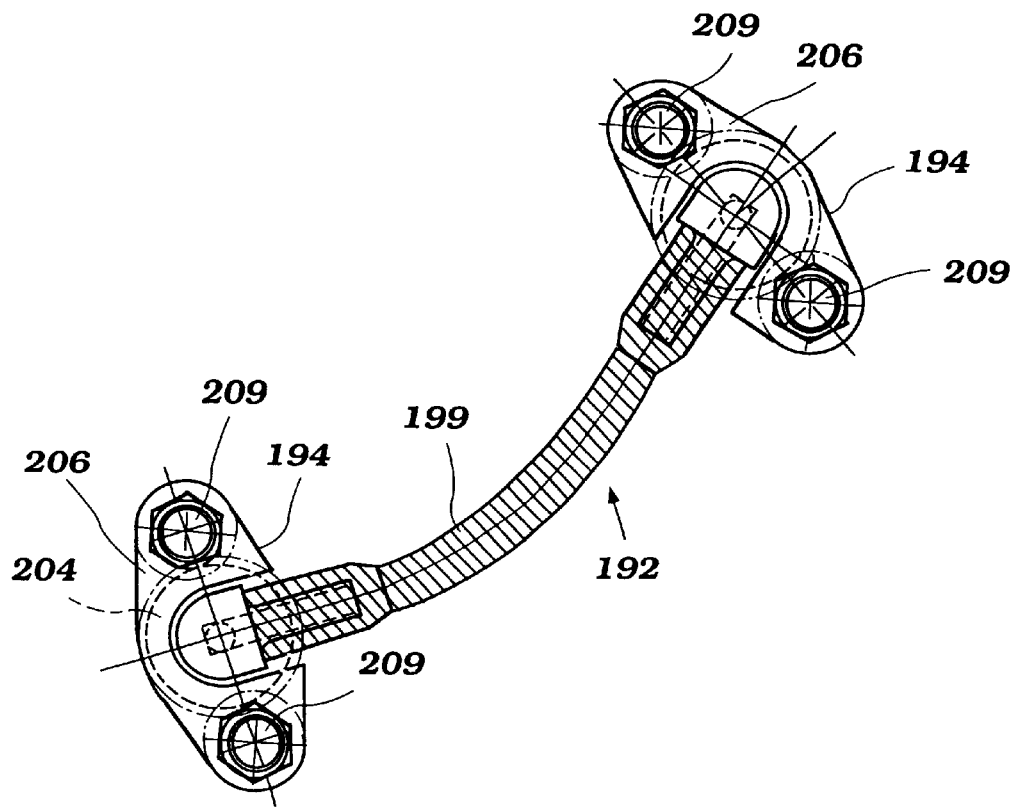
FIG. 11 is an enlarged front view showing another flexible conduit.
Figure 12:
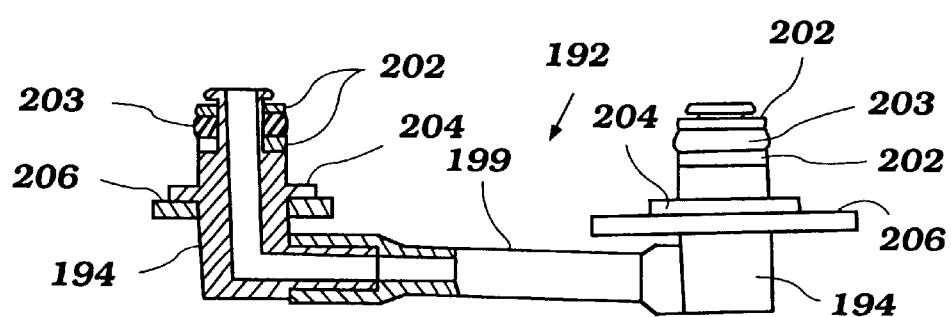
FIG. 12 is a cross-sectional view showing the same flexible conduit as that shown in FIG. 11.

FIGS. 11 to 14 illustrate the flexible conduit 192. FIGS. 11 and 12 are an enlarged front view and a cross-sectional view showing the flexible conduit 192, respectively. FIG. 13A shows a side view (left-hand) and FIG. 13B shows a front view (right-hand) of a fixing member that is used for fixing the connector portion 194 of the flexible conduit 192. FIG. 14A shows a side view (left-hand) and FIG. 14B shows a front view (right-hand) of the connector portion 194.

The connector portion 194 is made of a metal and formed to have generally an L-shape. The end portions of the hose portion 199 of the flexible conduit 192 are caulked with each one side of the connector portion 194 without caulking members. The other side of the connecting portion 194 has a small diameter than the other part and a couple of backup rings 202 and an O ring 203 are provided therein. A flange 204 is formed around the connector portion 194. Meanwhile, a fixing metal member 206 is separately provided to fix the connector portion 194 to the fuel supply rails 123, 191 by holding down the flange 204. The fixing member 206 has a recess 207 that fits the end portion of the hose part 199 and a pair of bolt-holes 208 at both sides of the recess 207. Accordingly, the connector portions 194 and eventually the flexible conduit 192 can be affixed to the respective fuel supply rails 123, 191 with bolts 209 after the end portions with the backup ring 202 and the O ring 203 are inserted into the respective apertures that communicate with hollows in the respective fuel supply rails 123, 191.

Because of the separate fixing member 206, it is easier to assemble the flexible conduits 192 with the fuel supply rails 123, 191 in addition to that the flexible conduits 192 can be produced at relatively low costs. Also, the backup rings 202 and the O rings 203 can surely prevent alien substances from entering the fuel.

Figure 15:
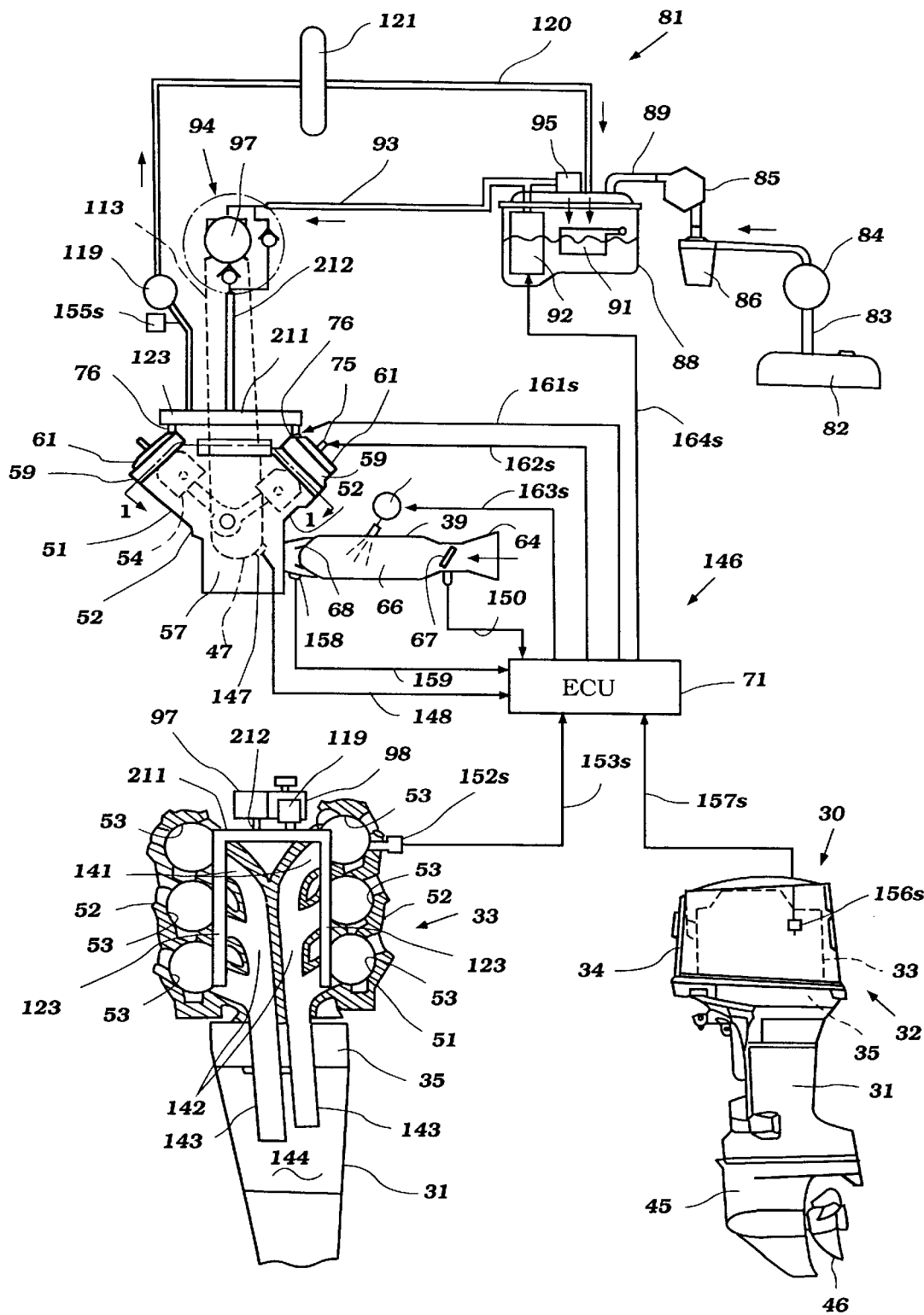
FIG. 15 is a multi-part view showing another outboard motor which embodies another fuel supply arrangement therein.

FIG. 15 illustrates a multi-part view showing another outboard motor which embodies another fuel supply arrangement therein.

In this embodiment, the fuel supply rails 123 are rigidly connected with a fuel supply rail 211 that extends horizontally and then the high pressure fuel pump 97 and the fuel supply rail 211 are connected to each other with a flexible conduit 212. The relief line 120 is connected to the fuel supply rail 211. The other part of this embodiment is the same as shown in FIG. 1.

Figure 16:
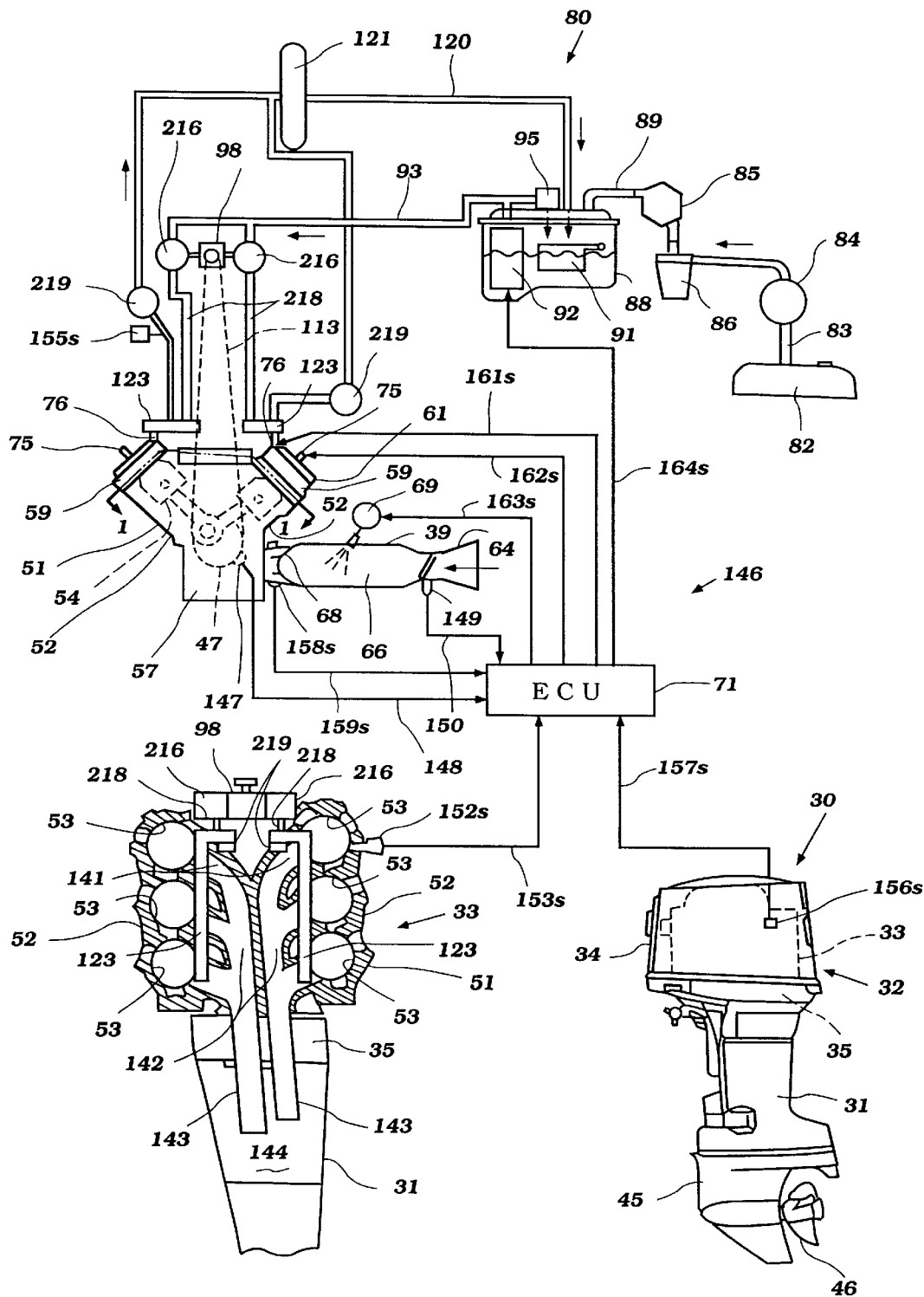
FIG. 16 is a multi-part view showing still another outboard motor which embodies still another fuel supply arrangement therein.

FIG. 16 illustrates a multi-part view showing still another outboard motor which embodies still another fuel supply arrangement therein.

In this embodiment, a pair of high pressure fuel pumps 216 are provided in stead of the single fuel pump 97. The high pressure fuel pumps 216 are connected to the respective fuel supply rails 217 by means of a couple flexible conduits 218. The relief line 120 is connected to one of the fuel supply rails 217. The high pressure fuel pumps 216 are driven by the single pump drive unit 98 that is used in the first embodiment except that the drive mechanism is slightly different because of being doubled. A pair of high pressure regulators 219 are provided on the respective fuel supply rails 123 so that fuel pulsation generated in each high pressure fuel pump 216 does not exert influence relative to each other.

Figure 17:
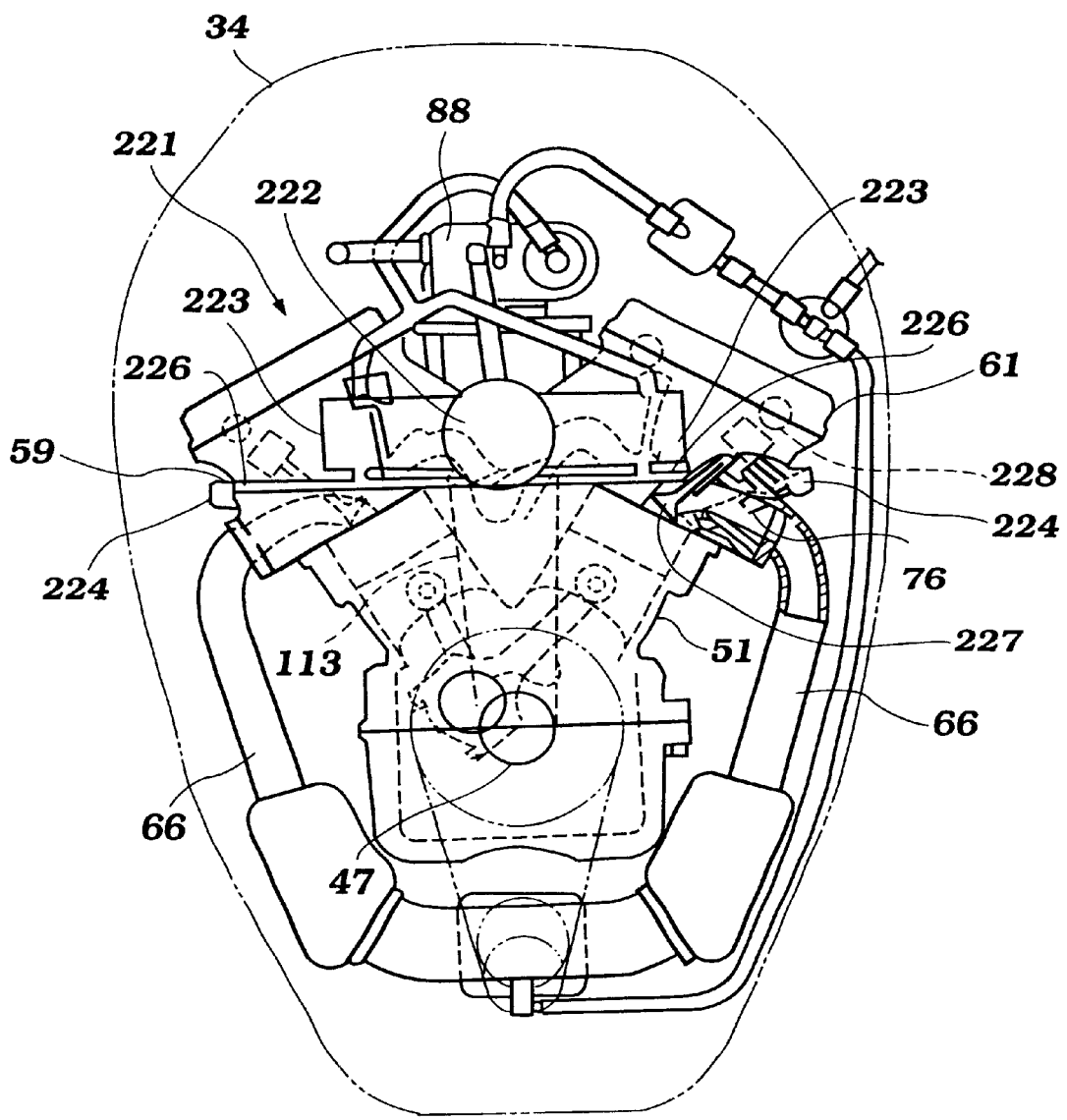
FIG. 17 is a top plan view of another power head showing the engine in solid lines and the protective cowling in phantom.

FIG. 17 illustrates a top plan view of another power head showing the engine in solid lines and the protective cowling in phantom.

This power head incorporates a four stroke engine 221 therein. A pump drive unit 222 is provided on the engine 221 and a pair of high pressure fuel pumps 223 are located at both sides of the pump drive unit 222. A pair of fuel supply rails 224 are provided and connected with the high pressure fuel pumps 223 with flexible conduits 226. Special components for the four stroke engine 221 are, for example, an intake valve 227 and a camshaft 228.

It should be noted that the fuel supply rails are not necessarily required if the engine has a single cylinder or few cylinders. Unless the fuel supply rails are applied, flexible conduits are directly connected to fuel injectors.

It should be also noted that this invention is applicable not only to outboard motors but also to other engines for marine propulsion devices such as a stern drive system in which an engine is provided on a watercraft, for land vehicles such as a motorcycle and an automobile or utility machines such as a lawn mower, and stationary engines.

As described above, in accordance with the preferred embodiments, a high pressure fuel injection assembly that can be mounted on different engine parts easily even if the engine parts and/or the high pressure fuel injection assembly per se have accumulated tolerances. Also, vibrations produced in multiple components including engine parts are effectively absorbed without exerting influence relative to each other.

Of course, the foregoing description is that of preferred embodiments of the invention, and various changes and modifications may be made without departing from the spirit and scope of the invention, as defined by the appended claims.

What is claimed is:

1. A direct fuel injected system for an internal combustion engine having a combustion chamber, comprising a high pressure fuel pump for developing high pressure in fuel, a fuel injector for directly injecting the fuel into the combustion chamber, a flexible conduit for connecting said high pressure fuel pump with said fuel injector, and said flexible conduit comprising a structure inhibiting outward expansion.

2. A direct fuel injected system as set forth in claim 1, wherein said flexible conduit has at least an anti-corrosion nature.

3. A direct fuel injected system as set forth in claim 1, wherein said engine powers a marine propulsion device.

4. A direct fuel injected system as set forth in claim 1, wherein said engine operates on a two stroke crankcase compression principle.

5. A direct fuel injected system as set forth in claim 1, wherein said engine operates on a four stroke combustion principle.

6. A direct fuel injected system for a multi-cylinder, internal combustion engine having a plurality of combustion chambers, comprising a high pressure fuel pump for developing high pressure in fuel, a plurality of fuel injectors for directly injecting the fuel into the respective combustion chambers, a fuel supply rail for supplying the fuel from said high pressure fuel pump to said fuel injectors, and a flexible conduit for connecting said high pressure fuel pump with said fuel supply rail.

7. A direct fuel injected system as set forth in claim 6, wherein said fuel supply rail supports the respective fuel injectors.

8. A direct fuel injected system as set forth in claim 6, wherein said fuel supply rail is formed with a rigid member.

9. A direct fuel injected system as set forth in claim 6, wherein said high pressure fuel pump and said fuel supply rail are affixed to different portions of said engine relative to each other.

10. A direct fuel injected system as set forth in claim 6, wherein said engine includes a cylinder block defining a plurality of cylinder bores in which pistons reciprocate, and a cylinder head member closing one ends of said cylinder bores so as to define said combustion chambers with said cylinder bores and said pistons, and said high pressure fuel pump is affixed to said cylinder block and said fuel supply rail is affixed to said cylinder head member.

11. A direct fuel injected system as set forth in claim 6, wherein said fuel supply rail has at least one fastening portion at which a temporary member is fastened, and said temporary member temporarily supports said fuel injectors.

12. A direct fuel injected system as set forth in claim 11, wherein said fastening portion includes a fastener receiving hole.

13. A direct fuel injected system as set forth in claim 6, wherein said high pressure fuel pump and said fuel supply rail each has a fastening portion at which a temporary member is fastened, and said temporary member temporarily connects said high pressure fuel pump to said fuel supply rail.

14. A direct fuel injected system as set forth in claim 13, wherein said fastening portion includes a fastener receiving hole.

15. A direct fuel injected system as set forth in claim 6, wherein at least one of said high pressure fuel pump and said fuel supply rail is affixed to said engine by a positioning member.

16. A direct fuel injected system as set forth in claim 15, wherein said positioning member includes a positioning fastener, and said engine has a fastener receiving hole to receive said positioning fastener.

17. A direct fuel injected system as set forth in claim 16, wherein said positioning fastener includes a first portion which has a small diameter, a second portion which has a large diameter greater than the small diameter, and a third portion which is tapered to connect said first portion with said second portion.

18. A direct fuel injected system as set forth in claim 15, wherein said positioning member includes a tapered collar member put on said positioning fastener so that the positioning fastener and the collar member together form a small diameter portion, a tapered portion and a large diameter portion one after another, and said large diameter portion has a diameter that is greater than a diameter of said small diameter portion.

19. A direct fuel injected system as set forth in claim 15, wherein at least one of said high pressure fuel pump and said fuel supply rail has an opening that is sufficiently larger than said positioning member so as to accommodate misalignment between said high pressure fuel pump or the fuel supply rail and said positioning member.

20. A direct fuel injected system as set forth in claim 6, wherein said flexible conduit includes an inner part and an outer part.

21. A direct fuel injected system as set forth in claim 20, wherein one of said inner part and said outer part has an anti-corrosion nature.

22. A direct fuel injected system as set forth in claim 20, wherein said inner part is made of a synthetic resin.

23. A direct injected system as set forth in claim 20, wherein said outer part is made of a metal mesh.

24. A direct fuel injected system as set forth in claim 20, wherein said inner part has an anti-pressure nature.

25. A direct fuel injected system as set forth in claim 6, wherein said flexible conduit is covered with a cover member.

26. A direct fuel injected system as set forth in claim 25, wherein said cover member is made of a flame retardant material.

27. A direct fuel injected system as set forth in claim 6 additionally comprising a second fuel supply rail disposed between said high pressure fuel pump and said flexible conduit.

28. A direct fuel injected system as set forth in claim 27, wherein said second fuel supply rail is formed with a rigid member so as to be affixed to said engine.

29. A direct fuel injected system as set forth in claim 6, wherein said engine includes a cylinder block defining a plurality of cylinder bores in which pistons reciprocate, a crankcase closing one ends of said cylinder body, a crankshaft rotatable journaled within said crankcase and rotated by said pistons, and said high pressure fuel pump is driven by said crankshaft.

30. A direct fuel injected system as set forth in claim 6, wherein said engine operates on a two stroke crankcase compression principle.

31. A direct fuel injected system as set forth in claim 6, wherein said engine operates on a four stroke combustion principle.

32. A direct fuel injected system as set forth in claim 6, wherein said engine powers a marine propulsion device.

33. A direct fuel injected system for a multi-cylinder, internal combustion engine having a cylinder block forming two banks of a V arrangement, each bank of said cylinder block defining a plurality of cylinder bores extending generally horizontally and spaced vertically from each other, said system comprising a high pressure fuel pump for developing high pressure in fuel, a plurality of fuel injectors for directly injecting the fuel into the respective combustion chambers, a pair of generally vertically extending fuel supply rails for supplying the fuel from said high pressure fuel pump to said fuel injectors, a pair of flexible conduits for connecting said high pressure fuel pump with each one of said fuel supply rails.

34. A direct fuel injected system as set forth in claim 33, wherein said fuel supply rails support the respective fuel injectors so that the fuel injectors extend generally horizontally and spaced vertically from each other so as to correspond to the respective cylinder bores.

35. A direct fuel injected system as set forth in claim 33, wherein said fuel supply rails are formed with rigid members.

36. A direct fuel injected system as set forth in claim 33, wherein said high pressure fuel pump and said fuel supply rails are affixed to different portions of said engine relative to each other.

37. A direct fuel injected system as set forth in claim 33, wherein said cylinder block has an in-between portion extending between the two banks, each one of said banks has a cylinder head member so as to close one end of each one of said cylinder bores, said high pressure fuel pump is affixed to said in-between portion and the respective fuel supply rails are separately affixed to each one of the cylinder head members.

38. A direct fuel injected system as set forth in claim 10, said engine includes a pump drive unit for driving said high pressure fuel pump, said pump drive unit is affixed to said cylinder block, and the fuel pump is affixed to said cylinder block via said pump drive unit.

39. A direct fuel injected system as set forth in claim 20, wherein said inner part has an oil-proof nature.

40. An internal combustion engine comprising a cylinder block defining a top surface and a plurality of cylinder bores in which pistons reciprocate, the cylinder bores extending generally horizontally and spaced vertically from each other, a cylinder head member closing one ends of the cylinder bores and defining a plurality of combustion chambers with the cylinder bores and the pistons, a plurality of fuel injectors arranged to spray fuel directly into the respective combustion chambers, a fuel pump configured to pressurize the fuel, the fuel pump being disposed at the top surface of the cylinder block, a fuel supply rail arranged to support the fuel injectors, the fuel supply rail extending generally vertically so that the respective fuel injectors correspond to the respective cylinder bores, and a flexible conduit coupling the fuel pump with the fuel supply rail.

41. An internal combustion engine as set forth in claim 40, wherein the fuel supply rail is deposed at the cylinder head member.

42. An internal combustion engine as set forth in claim 40 additionally comprising a pump drive unit arranged to drive the fuel pump, the pump drive unit is affixed to the top surface of the cylinder block, and the fuel pump is affixed to the pump drive unit.

43. A direct fuel injected system as set forth in claim 1, wherein said flexible If conduit includes an inner part and an outer part.

44. A direct fuel injected system as set forth in claim 43, wherein one of said inner part and said outer part has an anti-corrosion nature.

45. A direct fuel injected system as set forth in claim 43, wherein said inner part is made of synthetic resin.

46. A direct fuel injected system as set forth in claim 43, wherein said outer part is made of a metal mesh.

47. A direct fuel injected system as set forth in claim 43, wherein said inner part has an anti-pressure nature.

48. A direct fuel injected system as set forth in claim 1, wherein said flexible conduit is covered with a cover member.

49. A direct fuel injected system as set forth in claim 48, wherein said cover member is made of a flame retardant material.

* * * * *